United States Patent [19]

Rohr et al.

[11] Patent Number: 4,804,095

[45] Date of Patent: Feb. 14, 1989

[54] CUTOFF DEVICE FOR CRANE SYSTEMS

[75] Inventors: Wolfgang Rohr; Jochen Bohr, both of Speyer, Fed. Rep. of Germany

[73] Assignee: Rohr GmbH, Speyer, Fed. Rep. of Germany

[21] Appl. No.: 198,703

[22] Filed: May 17, 1988

Related U.S. Application Data

[63] Continuation of Ser. No. 916,170, Oct. 7, 1986, abandoned.

[30] Foreign Application Priority Data

Oct. 12, 1985 [DE] Fed. Rep. of Germany ....... 3536472

[51] Int. Cl.[4] .............................................. B66C 13/08
[52] U.S. Cl. ........................................ 212/152; 37/71;
 37/72; 37/DIG. 1; 212/153; 254/275; 340/860
[58] Field of Search ................ 212/152, 153; 254/264,
 254/273, 274, 275, 276; 324/207, 208; 340/685,
 860, 861; 37/DIG. 1, 54, 58, 71, 72

[56] References Cited

U.S. PATENT DOCUMENTS

| | | | |
|---|---|---|---|
| 2,496,101 | 1/1950 | Massey | 37/71 |
| 2,623,387 | 12/1952 | Pitcher et al. | 340/860 |
| 2,882,516 | 4/1959 | Neergaard | 324/208 |
| 4,047,311 | 9/1977 | Kelley | 37/54 |
| 4,186,609 | 2/1980 | Baermann | 324/208 |
| 4,305,072 | 12/1981 | Makita | 324/208 |
| 4,334,217 | 6/1982 | Nield et al. | 212/153 |
| 4,584,784 | 4/1986 | Wolters et al. | 37/DIG. 1 |

FOREIGN PATENT DOCUMENTS 2144091 2/1985 United Kingdom ................ 254/264

Primary Examiner—Sherman D. Basinger
Assistant Examiner—Thomas J. Brahan
Attorney, Agent, or Firm—Kinzer, Plyer, Dorn, McEachran & Jambor

[57] ABSTRACT

The cutoff device is provided for crane systems, especially a dredger to which a grab 1 is attached. Grab 1 has a cable 5 connected to it, which is guided over pulleys 4, 7 and kept under tension with the help of a weight 9. One of the two pulleys 4 is provided with an initiator 12 that has segments mounted on its periphery, so pulses are generated by the rotation of pulley 4 past the initiator and the drive mechanism is switched off when the pulses fail to occur.

5 Claims, 2 Drawing Sheets

CUTOFF DEVICE FOR CRANE SYSTEMS

This is a continuation of co-pending application Ser. No. 916,170 filed on Oct. 7, 1986.

This invention concerns a cutoff device for crane systems with a hoisting gear that has a holding winch for a grab or dredge implement suspended on cables.

The point when a rope- or motor-driven grab sets down on the ocean bottom is not visually perceptible, so appropriate cutoff devices are installed which automatically interrupt the downward movement when the grab reaches the ocean bottom and results in slack cable, and the winch is cut off. To solve this problem, a wide variety of measurement systems are known using Kobold motors to report the cutoff by measuring the motor current. So-called tappet switches are also known whereby the gear load is measured. In addition, signals are also sent by means of wire strain gages that measure the cable tension. Devices have also been provided on the cable drum to detect when the grab hits bottom by means of weighing mechanisms.

These known systems have the disadvantage that they operate relatively inaccurately and no slackline signals are relayed at all under especially serious conditions,.e.g., when the grab falls over on the ocean bottom. In addition, the known systems are very complex mechanically and are subject to extreme wear. Furthermore, frequent maintenance work is necessary, entailing the risk of accidents.

This invention is based on the problem of developing such a cutoff device in such a way that it will permit problem-free cutoff of the hoisting gear regardless of weight with a simple design under the rough operating conditions customary with crane systems, especially with dredgers.

This problem is solved according to this invention by the fact that a rope or cable is attached to the grab and is guided over pulleys and kept under tension, an initiator is attached to one of the pulleys to generate pulses and to stop the drive mechanism when there is no pulse.

It is advantageous that a weight with a roller is hung on the rope or cable.

An advantageous version consists of the fact that a noncontacting initiator is provided which can be set in vibration by a built-in resonant circuit, and iron segments that dampen the vibrations and thus produce pulses are provided on the pulley.

In addition, it is also advantageous for a magnetic switch to be provided on the pulley, where the switch consists of magnetic poles which have a microswitch with a trigger magnet.

It is advantageous that a generator is provided on the pulley, and a voltage interruption can be used as the cutoff pulse.

In addition, it is also proposed that the pulses which are generated by the initiator and are proportional to the path of the grab are transmitted to a recorder.

This invention offers the advantage that the point when the grab sets down on the ocean bottom can be detected with extremely simple equipment, so the device can also be used with programmable control systems whereby all dredging functions are controlled automatically. It is necessary here to use a 100% slackline recognition device in order to assure a safe and fully automatic dredging operation. The cutoff device may also be used to advantage with a wide variety of types of cranes for occupational and safety reasons.

This invention will now be explained in greater detail in the following description with reference to a practical example illustrated in the drawings.

Figure 1:
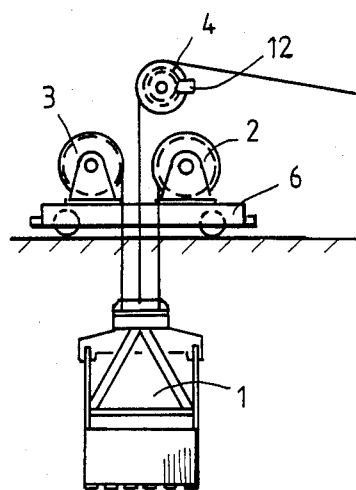
FIG. 1 shows a first practical example for such a cutoff device on a rope-driven grab.

FIG. 1 shows the arrangement of a rope-driven grab 1 on a crane trolley 6 where the crane trolley 6 is mounted on superstructures of a dredger in a known manner. The crane trolley 6 has a locking winch 2 and a holding winch 3. Grab 1 may also be mounted on a level luffing jib.

Grab 1 has a cable 5 attached to it and guided over a pulley 4 that can move with the grab 1 and another pulley 7 which is mounted stationary on a carrier 8, and a weight 9 is suspended with a roller 10 on cable 5, and end 11 of cable 5 is attached to the carrier 8. One of the two pulleys (pulley 4 in the example shown here) is provided with an initiator 12 which generates output pulses with the movement of grab 1 and thus with the rotation of roller 4, and these pulses are measured accordingly and processed. The downward movement of the cable is interrupted when grab 1 sets down on the ocean bottom. This stoppage is measured by initiator 12.

Figure 2:
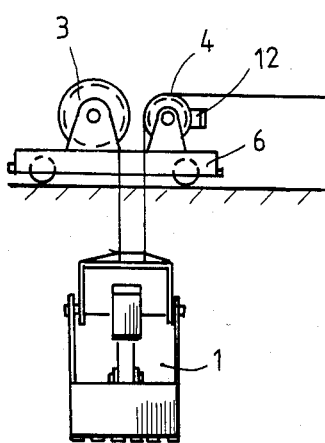
FIG. 2 shows such a device on a motor-driven hydraulic grab.

With a motor-driven hydraulic grab 1 according to FIG. 2, cable 5' is used for the cutoff device, and cable 5' is guided over pulley 4 with initiator 12 to grab 1 and over the other pulley 7 over weight 9 with roller 10 to carrier 8.

Figure 3:
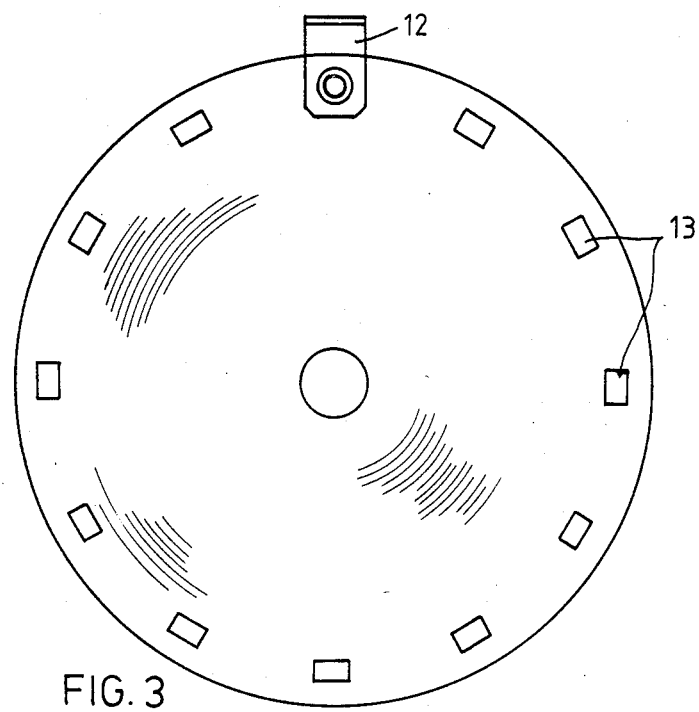
FIG. 3 shows a side view of the pulley used for the cutoff device.
Figure 4:
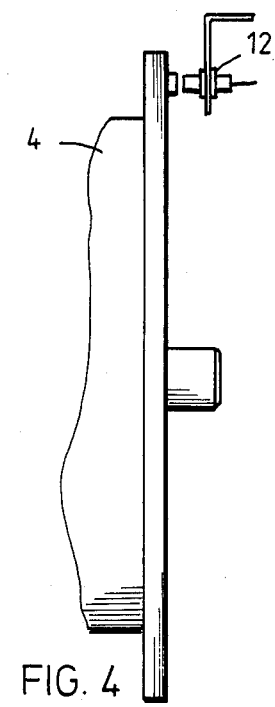
FIG. 4 shows a front view of the roller in detail.
Figure 5:
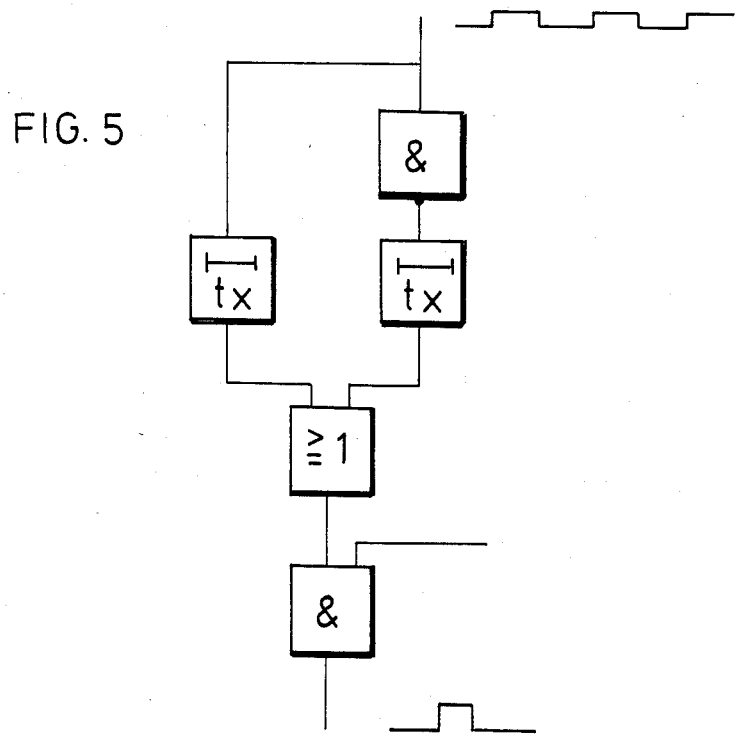
FIG. 5 shows one version of an electronic circuit for processing the pulses supplied by the cutoff device.

FIGS. 3 and 4 show a first practical example for the design of initiator 12, where segments 13 which trigger the pulses that are used are arranged uniformly around the periphery of pulley 4. In the noncontacting initiator shown here, it is a switch which is set in vibration by built-in resonant circuit. The resonance is attenuated by the movement of segments 13 made of iron and interpreted as pulses. The individual pulses are generated according to the rotation of pulley 4 and are analyzed with the help of a pulse monitor in an electronic array (FIG. 5). When the pulses do not arrive at uniform intervals or if they are not relayed continuously or at all, hoisting gear 3 is turned off. This assures that absence of a segment 13, a defect in the switch or an interrupted cable will be reported immediately as a stoppage and thus the hoisting gear 3 can no longer be moved in the downward direction. This yields an additional safety measure which can protect the crane system from major damage.

This type of cutoff can also be used to perform an accurate measurement of depth. The pulses of the initiator may be visualized on a display, for example, or recorded continuously by a conventional recorder. This continuous monitoring also serves the purpose of increasing safety in fully automatic dredging, i.e., chimney dredging can be detected promptly or different slope conditions which normally entail a risk of encumbrance or spillage can be detected.

Instead of the principle illustrated in FIGS. 3 and 4, a magnetic switch may also be provided as initiator 12, and in this case, segments 13 are made of magnetized iron, which attracts or releases a microswitch that is equipped with a magnet of the opposite pole as it passes by. In addition, it is also possible to flange mount a generator on roller 4 to generate a voltage with the rotation of the roller. By stopping the wheel, the generation of voltage is interrupted, and this can be used for the cutoff.

FIG. 5 shows a possible logic circuit for analysis of the pulses. If the pulse and pause time is exceeded, this is recognized as soon as the grab 1 has come in contact with the ground and pulley 4 has come to a standstill.

We claim:

1. In an underwater dredging operation in which a garb bucket is raised and lowered by a hoist system including a lift cable attached to the grab bucket and a driven hoist gear for the cable, a method of turning off the hoist gear when the bucket reaches bottom, comprising the steps of:
connecting an additional cable to the bucket and guiding the additional cable over two pulleys;
suspending a weight on said additional cable to maintain tension on the additional cable whereby the additional cable turns the two pulleys as long as the bucket is descending;
providing means for monitoring continuous rotation of one of said two pulleys during a descent of the grab bucket, as long as said one pulley continues to be rotated by said additional cable under tension; and turning off the hoist gear when monitoring that said one pulley is no longer rotating as a result of the event of the bucket hitting bottom, in which event said additional cable goes slack and no longer turns said one pulley.

2. Method according to claim 1 including the steps of attaching the additional cable at one end thereof to the grab bucket, securing the opposite end of the additional cable to a stationary member, and suspending said weight intermediate said opposite end of the additional cable and one of said pulleys.

3. Method according to claim 1 wherein said means for monitoring is a pulse generator on said one pulley to generate pulses due to rotation of said one pulley, monitoring continuous generation of pulses during rotation of said one pulley, and monitoring cessation of said pulses indicative of said event.

4. Method according to claim 2 wherein said means for monitoring is a pulse generator on said one pulley to generate pulses due to rotation of said one pulley, monitoring continuous generation of pulses during rotation of said one pulley, and monitoring cessation of said pulses indicative of said event.

5. Method according to claim 1 wherein said means for monitoring is a voltage generator on said one pulley to generate a voltage as said one pulley rotates, monitoring continuity of voltage during unhampered descent of the bucket and continued rotation of said one pulley, and monitoring voltage interruption indicative of said event.

* * * * *